3,093,506
HIGH MOLECULAR WEIGHT COPOLYMERS OF UNSATURATED ALDEHYDES AND THEIR PREPARATION AND USE

William T. Tsatsos, San Mateo, Calif., assignor to Shell Oil Company, New York, N.Y., a corporation of Delaware
No Drawing. Filed Dec. 30, 1960, Ser. No. 79,483
19 Claims. (Cl. 117—155)

This invention relates to new copolymers and their preparation. More particularly, the invention relates to new high molecular weight copolymers of unsaturated aldehydes, to their preparation and to useful and valuable derivatives thereof.

Specifically, the invention provides new and particularly useful copolymers comprising the produce of polymerization of a mixture of an unsaturated aldehyde, and preferably acrolein, and an ethylenically unsaturated acidic material, and preferably an ethylenically unsaturated carboxylic acid or anhydride, said copolymers containing more than 50% by weight of the said aldehyde and preferably having an intrinsic viscosity above 0.5 dl./g. The invention further provides a new process for preparing the above-described copolymers.

As a special embodiment, the invention provides new and valuable water-soluble derivatives of the above-described copolymers which are preferably obtained by (1) treating the above-described copolymers with basic materials, such as NaOH, or with basic materials in combination with aldehydes or ketones, or (2) by treating the above-described copolymers with sulfur dioxide or sodium bisulfite. As a further special embodiment, the invention provides a method for utilizing the water-soluble derivatives, particularly for the treatment of fibrous material, such as fabrics, paper and the like, to improve their properties.

As further special embodiment, the invention provides new and useful solvent-soluble derivatives of the above-described new high molecular weight copolymers.

It is known that unstabilized acrolein changes spontaneously into a solid insoluble polymer known as "disacryl." This same insoluble polymer can also be obtained by heating acrolein to high temperatures in the presence of peroxides. These insoluble polymers have never acquired any technical importance, chiefly because of their insolubility, their thermosetting nature and their low molecular weights.

It is an object of the invention, therefore, to provide new polymers of unsaturated aldehydes, such as acrolein. It is a further object to provide new copolymers of unsaturated aldehydes which have high molecular weights. It is a further object to provide new copolymers of unsaturated aldehydes which are thermoplastic and can be molded to form valuable plastic products. It is a further object to provide new copolymers which have enhanced solubility in basic materials. It is a further object to provide new copolymers which can be converted with caustic, and particularly caustic and aldehydes or ketones, to form new polymeric hydroxy carboxylic acids and derivatives. It is a further object to provide new copolymers of unsaturated aldehydes which can be used to form water-soluble derivatives. It is a further object to provide new water-soluble derivatives of aldehyde polymers which are particularly useful and valuable. It is a further object to provide new derivatives which are useful for treating fibrous materials. These and other objects of the invention will be apparent from the following detailed description thereof.

It has now been discovered that these and other objects may be accomplished by the new copolymers of the invention comprising the product of polymerization of a mixture of an unsaturated aldehyde, and preferably acrolein, and an ethylenically unsaturated acidic material, and preferably an ethylenically unsaturated carboxylic acid or anhydride, said copolymers containing more than 50% by weight of the said aldehyde and preferably having an intrinsic viscosity above 0.5 dl./g. It has been surprisingly found that these particular copolymers possess many of the properties lacking in the prior known aldehyde polymers. These copolymers, for example, are thermoplastic and can be molded to desired shapes and sizes. In addition, the new products have enhanced solubility in alkali and can be converted on reaction with basic materials or basic materials with aldehydes or ketones to form new water-soluble derivatives. The new products also react with sulfur dioxide and sodium bisulfite to form valuable water-soluble materials. In addition, the new copolymers have high molecular weights and give products having improved strength and impact resistance.

The new water-soluble derivatives of the copolymers, such as obtained by reaction with base or with sulfur dioxide, having outstanding properties as sizing and treating agents for fibrous materials, such as fabrics, paper and the like, and impart improved strength, abrasion resistance and water resistance to the said materials.

It has also been found that the above-described copolymers can be converted to valuable solvent soluble derivatives which are particularly useful for the preparation of films, coatings, moldings and the like.

The unsaturated aldehydes used in preparing the new copolymers are preferably the alpha,beta-ethylenically unsaturated aldehydes, such as, for example, acrolein, and alpha- and beta-substituted acroleins, as methacrolein, alpha-ethylacrolein, alpha-butylacrolein, alpha-chloroacrolein, beta-phenylacrolein, alpha-octylacrolein, alpha-decylacrolein, alpha-cyclohexylacrolein and the like. The preferred aldehydes to be used in making the new copolymers include the alpha,beta- monoethylenically unsaturated monoalydehydes containing from 3 to 12 carbon atoms, and especially acrolein and the alpha- and beta-substituted acroleins wherein the substituent on the alpha and/or beta-positions is an alkyl, cycloalkyl or aryl group containing no more than 8 carbon atoms. 2-alkenals containing up to 8 carbon atoms come under special consideration.

The acidic material to be used in making the new copolymers include those ethylenically unsaturated monomers with acid or acid-forming groups. Preferred members of this group include the ethylenically unsaturated carboxylic acids and their anhydrides. Such acids may be monocarboxylic acid or polycarboxylic acids and may be substituted or unsubstituted. Examples of such materials include, among others, acrylic acid, methacrylic acid, crotonic acid, alpha-phenylacrylic acid, alpha-cyclohexylacrylic acid, beta-phenylacrylic acid, maleic acid, maleic anhydride, alpha-chloromaleic acid, tetrahydrophthalic acid, methyl-tetrahydrophthalic acid, tetrahydrophthalic anhydride, itaconic acid, fumaric acid, chloroacrylic acid, chloromaleic acid, chloromaleic anhydride, 7,9-dodecadienoic acid, 10,12-eicosadienoic acid, cyanoacrylic acid, methoxyacrylic acid, ethyl ester of maleic acid and the monobutyl ester of fumaric acid.

Especially preferred acidic materials to be employed include the monoethylenically unsaturated monocarboxylic acids containing up to 10 carbon atoms, the monoethylenically unsaturated polycarboxylic acids and their anhydrides containing up to 10 carbon atoms each. Especially preferred are the acrylic, methacrylic acids and the alkendioic acids containing up to 8 carbon atoms and their anhydrides.

The amount of the unsaturated aldehyde and the acidic material to be employed in making the new copolymers may vary within certain limits. The amount of the unsaturated aldehyde should preferably be more than 50% by weight of the mixture of monomers and still more preferably from 55% to 99% of the mixture. Especially preferred are those containing from 55% to 90% by weight of the aldehyde and the remainder the acidic material. These preferred products have outstanding solubility in alkali or alkali and aldehydes or ketones, as well as in sulfur dioxide and sodium bisulfite so as to form valuable water-soluble derivatives.

In some cases, it may be desirable to replace a portion of the acidic material with a dissimilar monomer. Examples of such other monomers include styrene, allyl alcohol, vinyl acetate, acrylonitrile, methacrylonitrile, allyl esters, vinylpyridine, vinyl halides, monoolefins and diolefins as ethylene, propylene, butylene, octylene, butadiene, isoprene, vinylpyrrolidone, acrylamide, N-ethyl acrylamide and the like, and mixtures thereof. These third monomers preferably make up from about .1% to 40% by weight of the combined mixture of monomers.

The new copolymers of the invention are preferably prepared by polymerizing the monomers in an aqueous system using a redox polymerization catalyst system, i.e., a free radical catalyst and a reducing agent. Examples of free radical yielding catalysts that may be employed include, among others, peroxides, such as benzoyl peroxide, hydrogen peroxide, potassium persulfate, potassium permanganate, methyl cyclohexyl peroxide, alkali perborates, diacetyl peroxide, tertiary butyl hydroperoxide, tertiary amyl hydroperoxide, ditertiary butyl peroxide, ditertiary hexyl peroxide, acetyl benzoyl peroxide, cumene hydroperoxide, tetralin hydroperoxide, phenyl-cyclohexane hydroperoxide, tertiary-butylisopropyl benzene hydroperoxide, tertiary butyl peracetate, tertiary butyl perbenzoate, ditertiary butyl phthalate, ditertiary butyl peradipate, tertiary butyl percarbonate and the like. Particularly preferred free radical yielding catalysts include the peroxides, such as the dialkyl peroxides, diaryl peroxides, tertiary alkyl hydroperoxides, alkyl peresters of percarboxylic acids, and particularly those of the above-noted groups which contain not more than 18 carbon atoms per molecule.

The above-described free radical yielding catalysts are employed in small amounts, the exact amount being dependent upon the particular type selected. In general, the amount of catalyst used will vary from about $1 \times 10^{-6}$ to about $2 \times 10^{-2}$ mols per mol of unsaturated monomer to be polymerized. Preferred amounts vary from about $1 \times 10^{-3}$ to $1 \times 10^{-4}$ mols per mol of material being polymerized.

The material employed with the above-described free radical yielding catalyst may be any of the various types of reducing agents. Examples of these include the organic sulfur compounds, such as sulfinic acids or their salts, alpha-oxysulfones, sulfoxylates, alpha-aminosulfones, thioethers which are preferably substituted by a hetero atom such as nitrogen in alpha position, or mercaptans with the simultaneous presence of labile halogen, mono or polyvalent aliphatic alcohols, beta-mercaptoethanol, levulinic acid, sterol compounds, dicyandiamidine, thiobarbituric acid, sulfur dioxide or water-soluble sulfur compounds, and particularly the sulfur dioxide or bisulfite derivatives of previously formed polymers of acrolein. Especially preferred reducing agents to be employed include the sulfur dioxide adducts of polyacroleins having an I.V. of at least 0.3 dl./g. and prepared by polymerizing acrolein in a redox catalyst system as described from the preparation of the copolymers of the present invention.

Salts of multivalent metals may also be used as reducing agents in the present process, but their presence is less preferred than the above-described types. By multivalent metal is meant one that can change its valency state reversibly. Examples of such metals include, among others, iron, manganese, copper, vanadium, cobalt, nickel, tin, silver, titanium, etc. When added to the reaction mixture, the metal must be at least in part in a lower valency state such as, for example, ferrous chloride, silver nitrate, titanium dichloride, cobaltous chloride, ferrous pyrophosphate, potassium ferrocyanide, manganous sulfate, ferrous sulfate, and the like. The anion portion of the metal salt may be of any type as long as the resulting salt has the necessary solubility in the reaction medium.

The amount of the reducing agent employed will vary depending on the amount of the peroxide catalyst employed. It is preferred to have from about .3 mol to 1.5 mols of reducing agent per mol of peroxide catalyst. Preferably, the reducing agent is employed in an amount varying from about .5 to 1 mol per mol of peroxide.

Particularly good results are obtained when an anticoalescent agent is included in the reaction mixture. The presence of such materials brings about an increase in rate of copolymerization and maintenance of molecular weight. The agent may be a cationic, anionic or non-ionic material and have a great variety of different compositions. Preferred materials include the ionic agents and especially those having a polar structure including a hydrophilic (predominantly hydrocarbon) residue and a charged (ionic) radical thereon, such as anionic surface active compounds including alkali metal and nitrogen-base soaps of higher fatty acids, such as potassium, and sodium myristate, laurate, palmitate, oleate, stearate, ammonium stearate, etc., as well as the surface-active compounds of the cation-active variety, such as salts of long-chain aliphatic amines and quaternary ammonium bases, such as lauryl amine hydrochloride, stearyl amine hydrochloride, palmityl amine hydrobromide. Additional examples of suitable ionic surface-active agents include the alkali metal or ammonium alkyl or alkylene sulfates or sulfonates, such as sodium and/or potassium lauryl sulfate, alkyl, aryl and alkylated arylsulfonates, cetyl sulfonate, oleylsulfonate, stearylsulfonate, sulfonated Turkey red oil, sulfonated mineral oils, sodium, potassium and ammonium isopropyl naphthalene sulfonate, amine substituted alcohols, sulfonated fatty esters and amides, the hydrochloride of diethyl aminoethyloleylamide, trimethylcetyl ammonium methyl sulfate, alkanesulfonic acids, alkali metal and ammonium salts of sulphonated long-chain hydrocarbons, or sulphonated long-chain fatty acids, such as sulphonated oleic acid and the sodium, potassium and ammonium salts of sulphated cetyl alcohol.

Also preferred are the non-ionic surface active agents, i.e., those which are not salts and are not subject to ionization when added to water. Examples of these agents include, among others, partial esters of polyhydric alcohols and saturated or unsaturated fatty acids and preferably fatty acids containing at least and more preferably from 12 to 18 carbon atoms, and hexitans and hexitides such as sorbitan or mannitan monolaurate, monopalmitate, monostearate, monooleate or the monoesters of coconut oil fatty acids and the like products described in U.S. 2,322,830. Other examples of partial esters of this type include the pentaerythritol mono- and dipalmitate, pentaerythritol mono- and disterate, pentaerythritol mono- and dioleate, 1,2,6-hexanetriol mono- and dicaproate, 1,2,6-hexanetriol mono- and dioleate, trimethylolpropane disterate, trimethylolpropane dilaurylate, polyglycerol dilaurate, inositol monolaurate, glucose monosterate, sucrose monooleate, polyglycol monooleate, polyglycol monostearate, and the like.

Examples of other suitable non-ionic agents include the hydroxypolyoxyalkylene ethers of the above-described partial esters. Specific examples of this include, among others, the polyethylene glycol ethers of sorbitan or mannitan monolaurate, monopalmitate, monooleate or monostearate. Other examples include the polyethylene glycol ethers or pentaerythritol mono- and dipalmitate, pentaerythritol mono- and disterate, trimethylolpropane distearate, polyglycerol dilaurate, inositol monolaurate and the like.

Other examples include the hydroxypolyoxyalkylene ethers of phenols, such as the reaction product of ethylene oxide and/or propylene oxide and phenols as phenol, bis-phenol-A, resorcinol, and the like, and mixtures thereof.

Other examples include di- and monoethers of polyhydric compounds and particularly the polyalkylene glycols. Especially preferred are the aryl and alkaryl polyethylene glycol ethers, such as phenyl polyethylene glycol monoether, xylylpolyethylene glycol monoether, alkyl phenyl polyalkylene glycol ethers, such as nonyl phenyl polyethylene glycol ether, isopropylphenyl polyethylene glycol monoether and the like.

The monomers to be polymerized may be added altogether at the beginning of the reaction or one or more of the monomers may be added in large amounts or in incremental proportions during the course of the reaction. If there is considerable difference in the rate of polymerization of the monomers, it is preferred to add the monomer which is consumed the fastest in small increments during the course of the polymerization reaction.

The temperature employed in the process may vary over a considerable range. It is generally preferred to employ relatively low temperatures. In general, temperatures will vary from a freezing point of the reaction to about 50° C. Preferred temperatures range from about 0° C. to 45° C. Atmospheric, superatmospheric or subatmospheric pressures may be utilized as desired.

The polymerization is preferably effected in an inert atmosphere. This may be preferably accomplished by passing inert gases, such as nitrogen, methane, etc., into and through the reaction mixture. It is also preferred to distill the monomers under nitrogen before use in the process.

The process may be conducted batchwise or on a semi-continuous or continuous scale.

When the amount of acidic material employed is quite large, the mixture containing the product may appear as a latex. This latex may be used as such in intended applications or may be coagulated by conventional means as addition of acid to give the solid polymer.

When the aldehyde is used in large amounts, copolymers will precipitate out as white solids and may be recovered by any suitable means, such as filtration, centrifugation and the like. After recovery, it is generally desirable to wash the copolymer with water and acetone and then dry the product.

The copolymers are solid substantially white high molecular weight products. They have intrinsic viscosities (as determined on the water-solubilized form) of at least 0.5 and preferably 0.9 to 5.0. These values are determined by the conventional technique of polyelectrolyte viscosity measurements at 25° C. On a mol weight basis, such polymers have molecular weights ranging from about 100,000 to about 3,000,000 as determined by the light scattering technique.

The new copolymers are also characterized by the fact that they contain free aldehyde groups or potentially free aldehyde groups. The copolymers are also characterized by being insoluble in water and insoluble in conventional solvents, such as benzene, toluene, acetone and the like.

Materials such as acetone tend to swell the polymer, but do not dissolve the material. The polymers may be dissolved by reaction with materials as alcohols, mercaptans and the like.

The above-described copolymers are thermoplastics and may be molded at high temperatures to form plastic articles. Temperatures used in the molding vary from about 90° C. to 300° C., and preferably between 100° C. and 250° C. Pressures employed in the molding may vary from about 3,000 p.s.i. to about 25,000 p.s.i. The moldings are usually transparent and flexible and can be used for a variety of plastic products, such as combs, pencils, etc.

The water-soluble derivatives of the new high molecular weight copolymers may be obtained by a variety of methods. They are preferably prepared by suspending the high molecular weight polymer in an aqueous solution containing the water-solubilizing agent, such as, for example, sulfur dioxide or an alkali bisulfite, such as sodium bisulfite. The amount of the polymer added will vary depending on the particular agent involved and the concentration of the agent. In general, it is preferred to add from 1 to 50 parts of the polymer per 100 parts of water. The concentration of the solubilizing agent will generally vary from about 1% to about 25%. Stirring and heating may be applied to assist in the dissolution. Temperatures employed will generally vary from about 20° C. to about 90° C. Various means, such as addition of small amounts of acid catalyst or the addition of swelling agents as acetone, tetrahydrofuran also may be employed to assist in the dissolution.

The water-soluble derivatives will have substantially the same molecular weight as the water-insoluble basic copolymer. In the case of the sulfur dioxide and bisulfite, the polymer will also contain a plurality of free sulfonic groups or water-soluble salt sulfonate groups contained in the polymer molecule and therefore may be regarded as polymeric polysulfonic acids and polymeric polysulfonates metal salts.

The water solubilized polymers may be used for a great many applications. As water solutions, they may be used in the formation of films, threads, treatment of animal skins, and the like, and as coatings for various materials as wood, metal and the like.

The copolymers solubilized with alkali bisulfites and aqueous sulfur dioxide have been found to be particularly useful as wet strength agents for paper. In this application, the polymers may be applied during the beater stage or as an after-treatment for the paper. Preferably the aqueous solution of the polymer is added during the beater stage when the suspension of paper pulp is being rapidly agitated. This addition may be at the beginning of the beater operation or intermittently or at the end of the operation. If the aqueous solution is applied to the finished paper, it may be added by spraying, or by rollers or by dipping or running the paper through the conventional padding apparatus.

After the aqueous solution has been applied to the paper as indicated above, the treated product is subsequently dried to effect cure. The drying may be accomplished by merely rolling or squeezing of the excess solution and then setting out in the air to dry or by using forced air. Temperatures used in the drying may vary from about room temperature, e.g., about 20° C. to 100° C. The period of drying will depend largely on the amount of pick-up and concentration of the polymer solution. In most instances, drying periods of from about 1 to 30 minutes should be sufficient.

Any type of paper may be treated according to the process of the invention. Examples of such paper include, for example, those prepared from wood, cotton, linen, hemp, jute, mulberry, straw, bamboo, cane and agone fibers or mixtures thereof, by any of the known processes such as the sulfate process, soda process and sulfite process. The paper may be colored or white and may be further treated for special applications.

The paper treated according to the above may be used for a variety of applications, such as facial tissue, hand towels, maps, filing cards, construction paper, wrapping paper, containers and the like. Because of its resistance to hydrolysis and relative non-toxic nature, the paper is particularly suited for use in preparing wrapper or containers for food.

The solvent-soluble derivatives of the above-described new high molecular weight polymers may be prepared by a variety of methods. They may be prepared, for example, by adding the solid polymer particles to a liquid medium containing a swelling agent, such as benzene, phenol and the like, an acid catalyst, such as p-toluenesulfonic acid, and a reactive diluent, such as aliphatic or cycloaliphatic alcohol, such as methanol, ethanol, ethylene glycol, hexylene glycol, 1,5-pentanediol and the like. The amount of polymer added will generally vary from about 1 to about 50 parts of polymer per 100 parts of solvent and swelling agent. The amount of catalyst employed will generally vary from about .1% to 5% by weight of the total solution. The amount of the swelling agent will vary from about 2 to 200 parts per 100 parts of the polymer. The amount of the reactive diluent employed will depend upon the degree of solubility and molecular structure change desired. If, for example, it is desired to convert all of the theoretical aldehyde groups to acetal groups, an excess over the theoretical amount of diluent needed to effect this change should be employed. In most cases, the amount of diluent employed will vary from about 10 parts to 100 parts per 100 parts of the polymer.

Stirring and heating may be employed to assist in the formation of the solvent-soluble derivatives. In most cases, temperatures varying from about 20° C. up to and including reflux temperatures of the solution may be employed.

The solvent-soluble polymer derivatives may be recovered by any suitable means, such as precipitation, extraction, distillation and the like.

The solvent-soluble derivatives are in most cases substantially white to light colored solids having substantially the same molecular weight as the basic insoluble polymer.

Solvent soluble derivatives of the polymer may be used in the preparation of moldings, coatings and impregnating solutions. The solvent soluble products may also be used as viscosity index improvers for various fluids, such as brake fluids and lubricating oil compositions.

To illustrate the manner in which the invention may be carried out, the following examples are given. It is to be understood, however, that the examples are for the purpose of illustration and are not to be regarded as limiting the invention in any way. Unless otherwise indicated, parts in the examples are parts by weight.

*Example I*

This example illustrates the preparation and use of a copolymer of acrolein and maleic anhydride.

To a glass reactor were added the following components in the order indicated: 90 parts of acrolein, 10 parts of maleic anhydride, 200 parts of water, 2.2 parts of a 9.1% solution of a polyacrolein-sulfur dioxide adduct, 1 part of nonyl phenol-ethylene oxide adduct and 20 parts of a 0.05 M solution of tertiary butyl hydroperoxide. The peroxide was added dropwise over .5 hour. The mixture was stirred under nitrogen and kept at room temperature over night. The reaction mixture was then filtered and a white polymer precipitate recovered. The resulting solid was identified as a high molecular weight copolymer of 90% acrolein and 10% maleic anhydride. The solid was insoluble in water, insoluble in acetone but dissolved in sodium hydroxide solution. The product from the dissolution in caustic was identified as a sodium salt of a polyhydroxy polycarboxylic acid containing a plurality of structural units as:

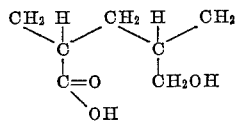

The sodium salt obtained by the reaction with caustic was dissolved in water to form a 2% solution and then used to treat cotton yarn by conventional padding technique. When dried, the resulting yarn showed improved resistance to abrasion and good fiber lay.

The above-described new copolymer was also dissolved in aqueous sulfur dioxide to form a water-soluble sulfonic acid derivative. This derivative was used to treat bleached kraft paper to improve the strength and abrasion resistance. In this experiment, a 2% water solution of the sulfur dioxide adduct was prepared and paper passed into and through the solution. The paper was then dried at room temperature. The resulting product had the appearance and feel of the untreated paper but demonstrated improvement in strength and abrasion resistance.

The above-described copolymer had thermoplastic properties and could be molded at 150° C. to form hard plastic castings.

Moldable plastic material was also prepared by reacting the above-described copolymer with an alcohol to form an acetal. In this experiment, 1 part of the copolymer was mixed with 40 parts of methanol, 150 parts of ethyl dichloride and .2 part of p-toluenesulfonic acid and the mixture stirred together. In a short while, the copolymer dissolved. Evaporation of the solution gave a solid acetal derivative which could be molded to give a hard plastic molding.

Related results are obtained by replacing the methanol in the above with equivalent amounts of each of the following: ethanol, butanol, and octyl alcohol. Acetal derivatives are obtained in each case.

*Example II*

Example I is repeated with the exception that the ratio of acrolein to maleic anhydride was changed to 80 parts acrolein and 20 parts of maleic anhydride. Related results are obtained.

*Example III*

To a glass reactor were added the following components in the order indicated: 70 parts of acrolein, 30 parts of maleic anhydride, 200 parts of water, 2.2 parts of 9.1% aqueous solution of polyacrolein-sulfur dioxide adduct, 1 part of nonylphenol-ethylene oxide adduct and 20 parts of a 0.05 M aqueous solution of tertiary butyl hydroperoxide. The peroxide was added over a period of ½ hour. The mixture was stirred and kept at room temperature over night. The reaction mixture was then filtered and a white polymer precipitate recovered. The resulting product was identified as a high molecular weight copolymer of 70% acrolein and 30% maleic anhydride. The wet polymer was soluble in sodium hydroxide. The product from the dissolution of the polymer in aqueous caustic was identified as a sodium salt of a polyhydroxy polycarboxylic acid containing the structural unit shown in Example I.

The above-described copolymer was also dissolved in aqueous sulfur dioxide to form a water-soluble sulfonic acid derivative. This derivative was used to treat bleached kraft paper to impart improved strength and abrasion resistance. In this experiment, a 2% water solution of the sulfur dioxide derivative was prepared and the paper passed into and through the solution. The paper was then dried at room temperature. The resulting product had the appearance and feel of the untreated paper but demonstrated improvement in strength and abrasion resistance.

The above-described copolymer was also molded at 150° C. to form a hard plastic casting.

*Example IV*

The procedure shown in the preceding example was repeated with the exception that the proportions of monomer were changed to 55 parts acrolein and 45 parts maleic anhydride. Related results are obtained.

*Example V*

This example illustrates the preparation and use of a copolymer of acrolein and itaconic acid.

To a glass reactor were added the following components in the order indicated: 300 parts of water, 1 part of nonylphenyl-ethylene oxide adduct, 2.2 parts of 9.1% polyacrolein-sulfur dioxide adduct, 90 parts of acrolein and 10 parts of itaconic acid. 20 parts of a 0.05 M solution of tertiary butyl hydroperoxide was added dropwise over a period of ½ hour. The mixture was stirred and kept at room temperature over night. The reaction mixture was then filtered and a white polymer precipitate recovered. The product was identified as a copolymer of 90 parts acrolein and 10 parts itaconic acid. The product was soluble in sodium hydroxide. The material from the dissolution of the polymer in aqueous caustic was identified as a sodium salt of a polyhydroxy polycarboxylic acid containing the structural unit shown in Example I.

The above-described copolymer was also dissolved in aqueous sulfur dioxide to form a water-soluble sulfonic acid derivative. This derivative was used to treat bleached kraft paper to impart improved strength and abrasion resistance. In this experiment, a 2% water solution of the sulfur dioxide derivative was prepared and the paper passed into and through the solution. The paper was then dried at room temperature. The resulting product had the appearance and feel of the untreated paper but demonstrated improvement in strength and abrasion resistance.

The above-described copolymer was molded at 150° C. to form a hard plastic casting.

Example VI

This example illustrates the preparation of a high molecular weight copolymer of acrylic acid and acrolein, and the use of the copolymer in the formation of valuable derivatives.

To a glass reactor were added the following components in the order indicated: 300 parts of water, 1 part of nonylphenol-ethylene oxide adduct, 2.2 parts of a 9.1% aqueous solution of a polyacrolein-sulfur dioxide adduct, 90 parts of acrolein and 10 parts of acrylic acid. 20 parts of a 0.05 M solution of tertiary butyl peroxide was added dropwise over a period of ½ hour. The reaction mixture was stirred under nitrogen at room temperature over night. The mixtue was then filtered and a white polymer precipitate recovered. The product was identified as a copolymer of 90 parts of acrolein and 10 parts of acrylic acid. The copolymer had an intrinsic viscosity of 1.3 dl./g.

The above-described copolymer was dissolved in aqueous sulfur dioxide to form acid derivative. This derivative was used to treat bleached kraft paper to impart improved strength and abrasion resistance. In this experiment, a 2% water solution of the sulfur dioxide derivative was prepared and the paper passed into and through the solution. The paper was then dried at room temperature. The resulting product had the appearance and feel of the untreated paper but demonstrated improvement in strength and abrasion resistance.

The above-described copolymer was molded at 150° C. to form a hard plastic casting.

Example VII

The procedure shown in the preceding example was repeated with the exception that the proportions of monomer were changed to 70 parts of acrolein and 30 parts of acrylic acid. Related results are obtained.

Example VIII

This example illustrates the preparation of a high molecular weight copolymer of methacrylic acid and acrolein, and the use of the copolymer in the formation of valuable derivatives.

To a glass reactor were added the following components in the order indicated: 75 parts of acrolein, 25 parts of methacrylic acid, 300 parts of water, 2.2 parts of a 9.1% solution of polyacrolein-sulfur dioxide adduct and 1 part of nonylphenol-ethylene oxide adduct. 20 parts of a 0.05 M solution of tertiary butyl peroxide was added dropwise over a period of ½ hour. The reaction mixture was stirred under nitrogen at room temperature over night. The mixture was then filtered and a white polymer precipitate recovered. The product was identified as a copolymer of 75 parts of acrolein and 25 parts of methacrylic acid. The copolymer had an intrinsic viscoity of 1.7 dl./g.

The above-described copolymer was dissolved in aqueous sulfur dioxide to form a water-soluble sulfonic acid derivative. This derivative was used to treat bleached kraft paper to impart improved strength and abrasion resistance. In this experiment, a 2% water solution of the sulfur dioxide derivative was prepared and the paper passed into and through the solution. The paper was then dried at room temperature. The resulting product had the appearance and feel of the untreated paper but demonstrated improvement in strength and abrasion resistance.

The above-described copolymer was molded at 150° C. to form a hard plastic casting.

Example IX

The procedure shown in the preceding example was repeated with the exception that the proportions of monomer were changed to 55 parts acrolein and 45 parts methacrylic acid. Related results were obtained.

Example X

The procedure shown in Example VIII was repeated with the exception that the proportions of monomers were changed to 95 parts acrolein and 5 parts methacrylic acid. Related results were obtained.

Example XI

Example VIII was repeated with the exception that the proportions of monomers were changed to 80 parts of acrolein and 20 parts of methacrylic acid. The resulting product which was identified as a high molecular weight solid copolymer of 80% acrolein and 20% methacrylic acid was molded at 150° C. to give a hard plastic molding having a Barcol hardness of 35.

1 part of the copolymer was mixed with 40 parts of methanol, 150 parts of ethyl dichloride and .2 part of p-toluenesulfonic acid and the mixture stirred together. In a short while, the copolymer dissolved. Evaporation of the solution gave a solid acetal derivative which could be molded to give a hard plastic molding.

Related results are obtained by replacing the methanol in the above with equivalent amounts of each of the following: ethanol, butanol, and octyl alcohol. Acetal derivatives are obtained in each case.

The invention claimed is:

1. A high molecular weight copolymer of an unsaturated aldehyde and an acidic material of the group consisting of ethylenically unsaturated carboxylic acids and ethylenically unsaturated polycarboxylic acid anhydrides, said copolymer containing more than 50% by weight of polymerized unsaturated aldehyde and having an intrinsic viscosity above about 0.5 dl./g.

2. A solid water-insoluble high molecular weight copolymer of acrolein and an acidic material of the group consisting of ethylenically unsaturated carboxylic acids and ethylenically unsaturated polycarboxylic acid anhydrides, said copolymer containing from 55% to 99% by weight of polymerized acrolein and having an intrinsic viscosity above about 0.5 dl./g.

3. A copolymer as defined in claim 2 wherein the acidic material is maleic anhydride.

4. A copolymer as defined in claim 2 wherein the acidic material is methacrylic acid.

5. A copolymer as defined in claim 2 wherein the acidic material is acrylic acid.

6. A copolymer as defined in claim 2 wherein the acidic material is itaconic acid.

7. A solid water-insoluble copolymer of acrolein and maleic anhydride, said copolymer containing 60% to 95% by weight of polymerized acrolein and having an intrinsic viscosity between 0.5 and 5.0 dl./g.

8. An aqueous latex of a copolymer defined in claim 2.

9. A water-soluble derivative of the group consisting of sulfur dioxide and sodium bisulfite adducts of the copolymer defined in claim 1.

10. A sulfur dioxide adduct of the copolymer defined in claim 1.

11. A sodium bisulfite adduct of the copolymer defined in claim 2.

12. A sulfur dioxide adduct of a copolymer of acrolein and methacrylic acid, the said copolymer containing at least 55% by weight of acrolein and having an intrinsic viscosity above 0.5 dl./g.

13. An acetal of an alkanol and the copolymer defined in claim 1.

14. An acetal of an alkanol and a high molecular weight solid copolymer of acrolein and an ethylenically unsaturated monocarboxylic acid containing up to 8 carbon atoms, said copolymer containing at least 55% by weight of polymerized acrolein and having an intrinsic viscosity of at least 0.5 dl./g.

15. A process for treating fibrous materials to improve their properties which comprises applying to the fibrous material an aqueous medium containing a water-soluble derivative of the copolymer defined in claim 1.

16. A process for treating paper to improve the wet strength thereof which comprises applying to the paper, at any stage of its preparation up to the dry sheet, an aqueous solution of a water-soluble derivative of a copolymer defined in claim 2.

17. A process for treating paper to improve the wet strength thereof which comprises impregnating the paper with an aqueous solution of a sulfur dioxide adduct of the copolymer defined in claim 2.

18. A process for preparing hydroxy carboxylic acids which comprises treating the copolymer defined in claim 1 with alkaline material.

19. A process for preparing hydroxy carboxylic acids which comprises treating a copolymer of acrolein and acrylic acid having an intrinsic viscosity of at least 0.5 dl./g. and containing at least 50% by weight of polymerized acrolein with aqueous caustic and then adding acid to precipitate the polymeric hydroxy carboxylic acid.

References Cited in the file of this patent

UNITED STATES PATENTS

| | | |
|---|---|---|
| 2,178,523 | Schmidt et al. | Oct. 31, 1939 |
| 2,259,512 | Barnes | Oct. 21, 1941 |
| 2,416,536 | Neher et al. | Feb. 25, 1947 |
| 2,657,192 | Miller et al. | Oct. 27, 1953 |

OTHER REFERENCES

Karrer: Organic Chemistry, Elsevier Pub. Co. (1946), pp. 244–245.